United States Patent
Stone

[11] Patent Number: 5,814,173
[45] Date of Patent: Sep. 29, 1998

[54] APPARATUS AND METHOD FOR POSITIVELY LOCATING AND ATTACHING AN EMBLEM ON A VEHICLE

[75] Inventor: Charles L. Stone, Metamora, Mich.

[73] Assignee: Chrysler Corporation, Auburn Hills, Mich.

[21] Appl. No.: 690,664

[22] Filed: Jul. 31, 1996

[51] Int. Cl.⁶ .................................................. B32B 31/00
[52] U.S. Cl. ............................ 156/71; 156/249; 156/285; 156/382; 156/391; 156/538; 156/556
[58] Field of Search ................................ 156/71, 285, 286, 156/382, 391, 538, 556, 580, DIG. 31, 247, 249; 269/21

[56] References Cited

U.S. PATENT DOCUMENTS

| | | | |
|---|---|---|---|
| 2,184,824 | 12/1939 | Von Hofe | 216/51 |
| 2,387,986 | 10/1945 | Evans | 33/180 |
| 2,816,366 | 12/1957 | Barlow | 33/180 |
| 3,057,073 | 10/1962 | Swartz | 33/180 |
| 3,130,103 | 4/1964 | Mattimoe et al. | 156/391 X |
| 3,236,715 | 2/1966 | Gunderson | 156/382 |
| 3,330,714 | 7/1967 | Gunderson | 156/286 |
| 3,554,834 | 1/1971 | Bennett et al. | 156/230 |
| 3,855,034 | 12/1974 | Miller | 156/297 |
| 3,948,719 | 4/1976 | Beckham | 156/556 |
| 3,984,279 | 10/1976 | Siryj | 156/556 |
| 4,337,108 | 6/1982 | Crankshaw et al. | 156/285 |
| 4,369,582 | 1/1983 | Pfeffer | 33/180 R |
| 4,503,618 | 3/1985 | Eberhardt | 33/180 R |
| 4,552,611 | 11/1985 | Dery et al. | 156/391 |
| 4,561,921 | 12/1985 | Treiber | 156/297 |
| 4,820,148 | 4/1989 | Anderson | 425/12 |
| 5,242,528 | 9/1993 | De Leonibus et al. | 156/538 |
| 5,336,357 | 8/1994 | Layher et al. | 156/391 |
| 5,645,676 | 7/1997 | Menko et al. | 156/359 |

*Primary Examiner*—James Sells

[57] ABSTRACT

An apparatus and method is provided for positively locating and attaching an emblem to a vehicle. The apparatus includes a frame having an elongated longitudinal member and a receptacle connected to the frame having a pocket therein for receiving an emblem. The apparatus also includes a retention member disposed within the pocket and positioned such that the retention member engages and holds the emblem in the pocket prior to attaching the emblem to a surface of a vehicle. The apparatus further includes at least one alignment finger connected to the longitudinal member for engaging the vehicle and positively locating the emblem relative to the vehicle.

15 Claims, 1 Drawing Sheet

APPARATUS AND METHOD FOR POSITIVELY LOCATING AND ATTACHING AN EMBLEM ON A VEHICLE

BACKGROUND OF THE INVENTION

1. Field of the Invention

The present invention relates generally to an apparatus and method for attaching an emblem to a vehicle and, more particularly, to an apparatus and method for positively locating and attaching an emblem on a vehicle.

2. Description of the Related Art

Automotive vehicles have long been marked by their respective manufactures with emblems that indicate either the vehicle model or the manufacture's name or both. In the past, manufactures have utilized hood ornaments, side panel emblems and emblems placed on trunk lids or rear body panels for identification purposes. As such, it is known to attach an emblem to the hood of a vehicle. However, in order to provide proper aesthetics, the emblem must be centered and properly located. Additionally, emblems having an adhesive back for mounting are known. Such emblems must be applied with a proper threshold pressure to ensure attachment to the vehicle. Due to the cost of today's vehicles and the concern of the consumer for vehicle appearance, it is imperative that the emblem be properly located and attached to the vehicle.

SUMMARY OF THE INVENTION

It is, therefore, one object of the present invention to provide an apparatus for positively locating and attaching an emblem on a vehicle.

It is another object of the present invention to provide an apparatus which holds the emblem in place while the emblem is properly positioned.

It is yet another object of the present invention to provide a method for positively locating and attaching an emblem to a vehicle in the proper position to improve vehicle aesthetics.

It is still another object of the present invention to provide an apparatus and method for positively locating and attaching an emblem to a hood of a vehicle.

To achieve the foregoing objects, the present invention is an apparatus for positively locating and attaching an emblem to a vehicle. The apparatus includes a support member. The apparatus also includes a receptacle connected to the support member having a pocket therein for receiving an emblem. The apparatus includes a retention member disposed within the pocket and positioned such that the retention member engages and holds the emblem in the pocket prior to attaching the emblem to a surface of a vehicle. The apparatus further includes at least one alignment finger connected to the support member for engaging the vehicle and positively locating the emblem relative to the vehicle.

Additionally, the present invention is a method for positively locating and attaching an emblem to a vehicle including the steps of providing a frame having a retention member and placing an emblem on the retention member wherein the retention member exerts a retention force on the emblem to hold the emblem in place. The method also includes the steps of engaging the frame at a known position on the vehicle and positively locating the position of the emblem on the vehicle and creating a vacuum around the retention member and forcing surface of the vehicle against the retention member to transfer the emblem from the retention member to the vehicle.

One advantage of the present invention is that an apparatus and method is provided for positively locating and attaching an emblem to a vehicle. Another advantage of the present invention is that the apparatus and method positively locates and attaches a hood emblem on a hood of an automotive vehicle. Yet another advantage of the present invention is that the method enables an operator to hold, locate and attach an emblem on a surface of a vehicle. A further advantage of the present invention is that the apparatus and method allow the emblem to be attached with a force suitable to ensure proper mounting on the surface of the vehicle.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
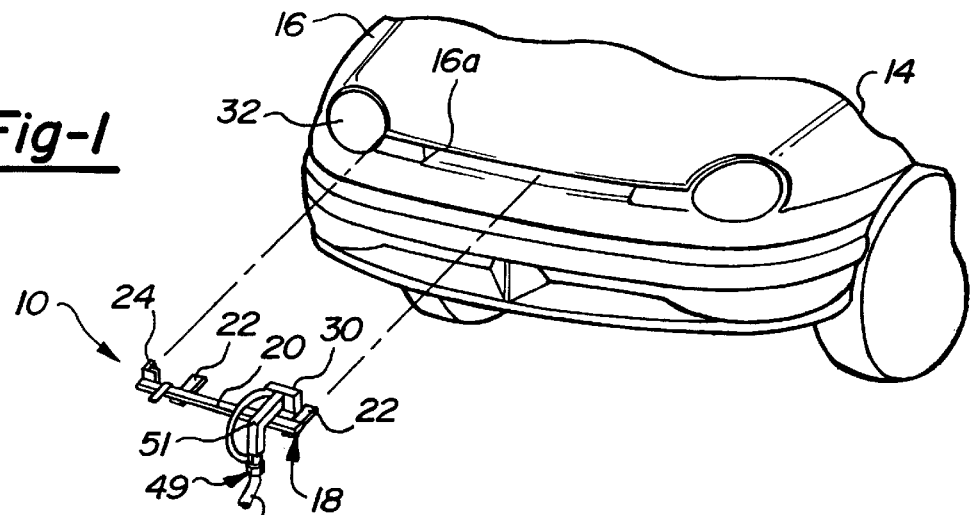
FIG. 1 is perspective view of an apparatus, according to the present invention, for positively locating and attaching an emblem on a vehicle illustrated in operational relationship with a front portion of a vehicle.
Figure 2:
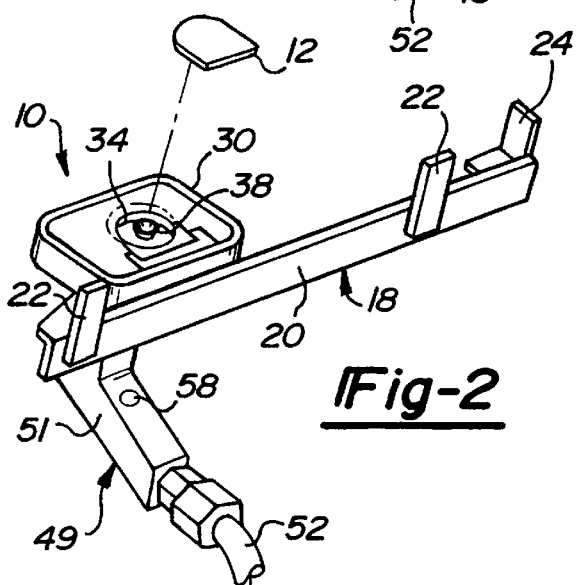
FIG. 2 is an enlarged perspective view of the apparatus of FIG. 1 illustrating an emblem prior to holding by the apparatus.

Referring to FIGS. 1 and 2, an apparatus 10, according to the present invention, is shown for positively locating and attaching an emblem 12 to a vehicle 14. The apparatus 10 holds the emblem 12 prior to attachment to the vehicle 14. The apparatus 10 is properly positioned on the vehicle 14, in this case along a front portion or hood 16 of the vehicle 14, to positively locate the emblem 12 relative to the hood 16 of the vehicle 14. The apparatus 10 is then used to attach the emblem 12 to the hood 16 of the vehicle 14. It should be appreciated that the apparatus 10 is used to apply a hood ornament as the emblem 12 to the hood 16 of the vehicle 14.

The apparatus 10 includes a frame 18 having an elongated or longitudinally extending support member 20. The frame 18 also has at least one, preferably a plurality of lower alignment fingers 22 attached generally perpendicular to the support member 20. The frame 18 has at least one side alignment finger 24 attached generally perpendicular to the support member 20 at one end 28 thereof.

The apparatus 10 also includes a receptacle 30 attached or fixed to the support member 20 by suitable means such as welding. The receptacle 30 is located on the support member 20 at a predetermined length or position in relation to the position of the lower alignment fingers 22 and the side alignment finger 24 on the support member 20 such that the position of the receptacle 30 controls the position or location of the emblem 12 relative to the fingers 22 and 24. The receptacle 30 is made of a flexible elastomeric material and acts as a bladder. The receptacle 30 has a pocket 34 therein. The pocket 34 is of a shape complementary to the emblem 12. It should be appreciated that the emblem 12 is placed within the pocket 34 prior to mounting or attaching the emblem 12 to the vehicle 14.

As illustrated in FIG. 1, the frame 18 is placed adjacent the hood 16 and engages the vehicle 14 such that the side alignment finger 24 is positioned next to a headlight 32 of the vehicle 14. When the lower alignment fingers 22 are placed directly under the hood 16, the receptacle 30 is properly located at the center of the hood 16 and at a distance from the lower edge 16a thereof such that the emblem 12 will be properly mounted. It should be appreciated that the fingers 22 and 24 engage the vehicle 14 at a predetermined location to positively locate the emblem 12 relative thereto.

Figure 3:
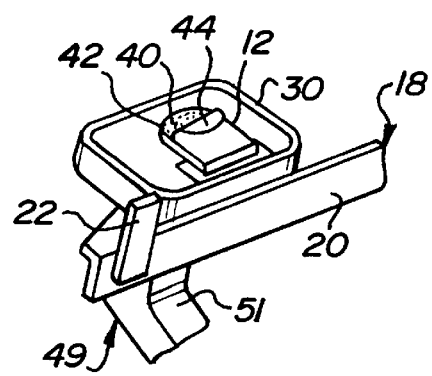
FIG. 3 is an enlarged partial perspective view of the apparatus of FIG. 1 illustrating the emblem held by the apparatus.
Figure 4:
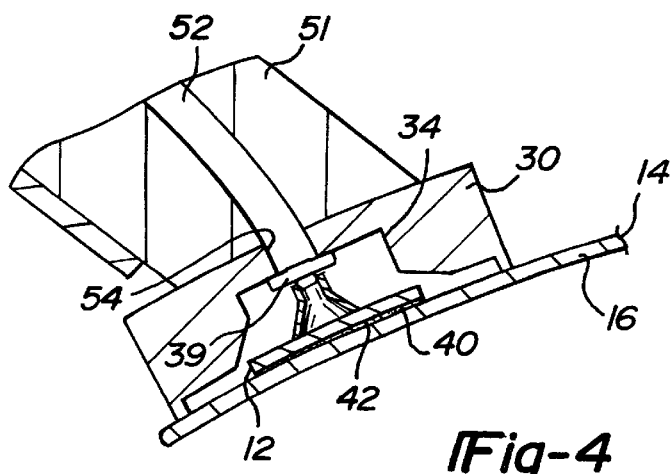
FIG. 4 is a fragmentary elevational view of the apparatus of FIG. 1 illustrating attachment of the emblem to a surface on the front portion of the vehicle.

Referring to FIGS. 2 through 4, the apparatus 10 includes a retention member 38 such as a suction cup typically formed of a resilient material, such as rubber or some type of silicone elastomer, positioned within the pocket 34 and used to secure the emblem 12 within the pocket 34. The retention member 38 is attached by a spring 39 to the receptacle 30 for a function to be described. It should be appreciated that, in use, an operator takes an emblem 12 and presses it into the pocket 34 thus deforming the suction cup and creating a vacuum which retains the emblem 12 in the pocket 34.

As illustrated in FIG. 3, the emblem 12 includes an adhesive layer 40 positioned on the rear or mounting surface 42 of the emblem 12. Typically, the adhesive layer 40 is covered by a backing 44, such as a paper coating or covering. Once the emblem 12 is positioned in the pocket 34 and securely held by the retention member 38, the backing 44 is removed to expose the adhesive layer 40 and the emblem 12 is ready to install or attach to the vehicle 14.

As illustrated in FIG. 1, the operator positions the frame 18 using the alignment fingers 22, 24 to properly locate the emblem 12 relative to the hood 16 of the vehicle 14. Once the emblem 12 is located on a surface of the hood 16, the emblem 12 may then be attached.

The apparatus 10 also includes a vacuum air system, generally indicated at 49, for attaching the emblem 12 to the hood 16. As illustrated in FIGS. 2 and 4, the vacuum air system 49 includes an air supply 50 and a vacuum pump 51 interconnected by a conduit 52. The vacuum pump 51 is attached to the receptacle 30. The receptacle 30 includes a small opening or aperture 54 in a base thereof which communicates with the conduit 52. The vacuum air system 49 also includes a control switch 58 operative to move between and open and closed position to allow or resist passage of air from the air supply 50 to the vacuum pump 51.

In operation, during the placement of the emblem 12 within the pocket 34, the control switch 58 is positioned in the closed position, thus no air is flowing to the vacuum pump 51. After the receptacle 30 and corresponding emblem 12 are properly aligned on the vehicle 14, the control switch 58 is then moved to the open position, allowing air to flow through the conduit 52 to the vacuum pump 51. The vacuum pump 51 creates a vacuum in the receptacle 30, and forces the emblem 12 against the hood 16. The spring 39 resists the retention member 38 from bottoming out against the receptacle 30. Next the control switch 58 is moved to the closed position, stopping the air to vacuum pump 51 and disconnecting the vacuum. The operator disengages the frame 18 from the vehicle 14, which forces the emblem 12 off of the retention member 38. It should be appreciated that the vacuum applies the necessary pressure to ensure that the adhesive on the emblem 12 is attached to the surface of the vehicle 14. It should also be appreciated that mounting the emblem 12 using the apparatus 10 set forth above allows an operator to properly mount, with correct mounting pressure and in the correct location the emblem 12 on a vehicle 14.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for positively locating and attaching an emblem to a vehicle comprising these steps of:

providing a frame having a retention member;

placing an emblem on the retention member wherein the retention member exerts a retention force on the emblem to hold the emblem in place;

engaging the frame at a predetermined position on the vehicle and positively locating the position of the emblem on the vehicle; and creating a vacuum around the retention member and forcing the surface of the vehicle against the retention member to transfer the emblem from the retention member to the vehicle.

2. A method as set forth in claim 1 including the step of pealing a backing off of the emblem to expose an adhesive located on a rear surface of the emblem prior to said step of creating.

3. A method as set forth in claim 1 including the step of activating an air supply to a vacuum pump to create the vacuum.

4. A method as set forth in claim 3 including the step of opening a control switch disposed between the air supply and the vacuum pump and allowing air to flow from the air supply to the vacuum pump to create a vacuum around the retention member.

5. A method as set forth in claim 1 including the step of placing the emblem on a suction cup of the retention member with sufficient force to cause the emblem to adhere to the suction cup.

6. A method for positively locating and attaching an emblem to a vehicle comprising the steps of:

providing a frame having at least one alignment finger and a retention member;

placing an emblem on the retention member wherein the retention member exerts a retention force on the emblem to hold the emblem in place;

pealing off a backing of the emblem to reveal an adhesive on a rear surface of the emblem;

engaging the alignment finger with the vehicle at a predetermined position and positively locating the position of the emblem on the vehicle; and activating an air supply to a vacuum pump to create a vacuum around the retention member.

7. An apparatus for positively locating and attaching an emblem having a front face and a back face to a vehicle, said emblem having an adhesive on one of said faces, said apparatus comprising:

a frame including an elongated longitudinal member;

a receptacle connected to said frame having a pocket therein for receiving am emblem;

a retention member disposed within said pocket and positioned such that said retention member engages the emblem and holds the emblem in the pocket prior to attaching the emblem to a surface of the vehicle with the face having the adhesive facing out of said pocket;

at least one alignment finger connected to said longitudinal member for engaging the vehicle and positively locating the emblem relative to the vehicle; and a vacuum air system to apply a vacuum around said retention member to force the emblem into tight contact with the vehicle, causing said emblem to adhesively attach to said vehicle.

8. An apparatus as set forth in claim 7 wherein said retention member is formed of a resilient material.

9. An apparatus as set forth in claim 7 wherein said retention member is a suction cup.

10. An apparatus as set forth in claim 7 wherein said at least one alignment finger comprises a side alignment finger positioned on one end of said longitudinal member.

11. An apparatus as set forth in claim 7 including a plurality of lower alignment fingers attached to said elongated longitudinal member.

12. An apparatus as set forth in claim 7 wherein said receptacle includes an aperture therein.

13. An apparatus as set forth in claim 7 wherein said vacuum air system comprises an air supply, a vacuum pump and a conduit connecting said air supply to said vacuum pump such that said vacuum pump supplies a vacuum to said aperture and around said retention member.

14. An apparatus as set forth in claim 13 including a control switch positioned between said air supply and said vacuum pump such that opening said control switch allows a vacuum to said aperture.

15. An apparatus for positively locating and attaching an emblem to a vehicle, said apparatus comprising:

a frame including an elongated longitudinal member and a side alignment finger positioned on one end of said longitudinal member to engage the vehicle;

a plurality of lower alignment fingers attached to said elongated longitudinal member to engage the vehicle;

a receptacle connected to said frame, said receptacle having a pocket therein for receiving an emblem;

a suction cup disposed within said pocket, said suction cup positioned such that it engages the emblem and holds the emblem in said pocket prior to attaching the emblem to the vehicle;

said receptacle including an aperture therein; an air supply, a vacuum pump and a conduit connecting said air supply to said vacuum pump; and a control switch positioned between said air supply and said vacuum pump to create a vacuum to said aperture around said suction cup.

* * * * *